United States Patent [19]

McLarnon

[11] 3,870,288

[45] Mar. 11, 1975

[54] PIPE FABRICATION JIG

[76] Inventor: J. Stanley McLarnon, 460 Fairfield Ave., Greenfield Park, Quebec, Canada

[22] Filed: July 9, 1973

[21] Appl. No.: 377,296

[52] U.S. Cl. ................ 269/45, 29/200 P, 228/49, 269/71
[51] Int. Cl. .................................. B23p 19/00
[58] Field of Search .......... 29/200 P, 200 J; 228/48, 228/49; 269/45, 71, 73

[56] References Cited
UNITED STATES PATENTS

| | | | |
|---|---|---|---|
| 2,500,204 | 3/1950 | Ronay | 29/200 P |
| 2,817,892 | 12/1957 | Jones | 269/45 X |
| 2,835,964 | 5/1958 | Yarwood | 269/71 X |
| 3,046,006 | 7/1962 | Kulicke | 269/71 X |
| 3,148,873 | 9/1964 | Chandler | 269/71 |
| 3,239,209 | 3/1966 | Kucka | 228/48 X |
| 3,772,753 | 11/1973 | Sargeant | 228/48 X |

FOREIGN PATENTS OR APPLICATIONS

| | | | |
|---|---|---|---|
| 376,971 | 6/1923 | Germany | 269/71 |

*Primary Examiner*—Roy Lake
*Assistant Examiner*—Mark S. Bicks
*Attorney, Agent, or Firm*—Larson, Taylor and Hinds

[57] ABSTRACT

A pipe component locating plate assembly is movable along a horizontal track at right angles to a second locating plate assembly movable along a second horizontal track, the latter being supported by trolleys for movement along a pair of rails parallel to the first track. Each locating plate assembly includes a wheeled carriage carrying a horizontally rotatable turntable equiped with vertical guides on which a locating plate is vertically slidable and adjustable. A wheeled locating plate unit is also movable along the second track. The jig provides universally adjustable orientation of the several locating plates for supporting various components of pipe which are to be welded together.

7 Claims, 11 Drawing Figures

PIPE FABRICATION JIG

This invention relates to new and useful improvements in pipe fabricating jigs, and the principal object of the invention is to facilitate accurate supporting of components such as pipe, elbows, tees, flanges, et cetera, at appropriate locations and in proper attitude to one another, during their assembly by welding into a fabricated unit.

As such, the jig of the invention utilizes locating plate assemblies which are movable along tracks and rails in different directions and each of which is horizontally rotatable as well as vertically adjustable, so that the locating plates may be properly positioned to support various components of the work in selected relationship while they are tack welded together preparatory to final welding.

The jig of the invention is simple in construction, highly accurate in operation, and capable of accommodating a virtually endless variety of pipe components in a multitude of different arrangements.

With the foregoing more important object and features in view and such other objects and features which may become apparent as this specification proceeds, the invention will be understood from the following description taken in conjunction with the accompanying drawings, wherein like characters of reference are used to designate like parts, and wherein.

Figure 1:
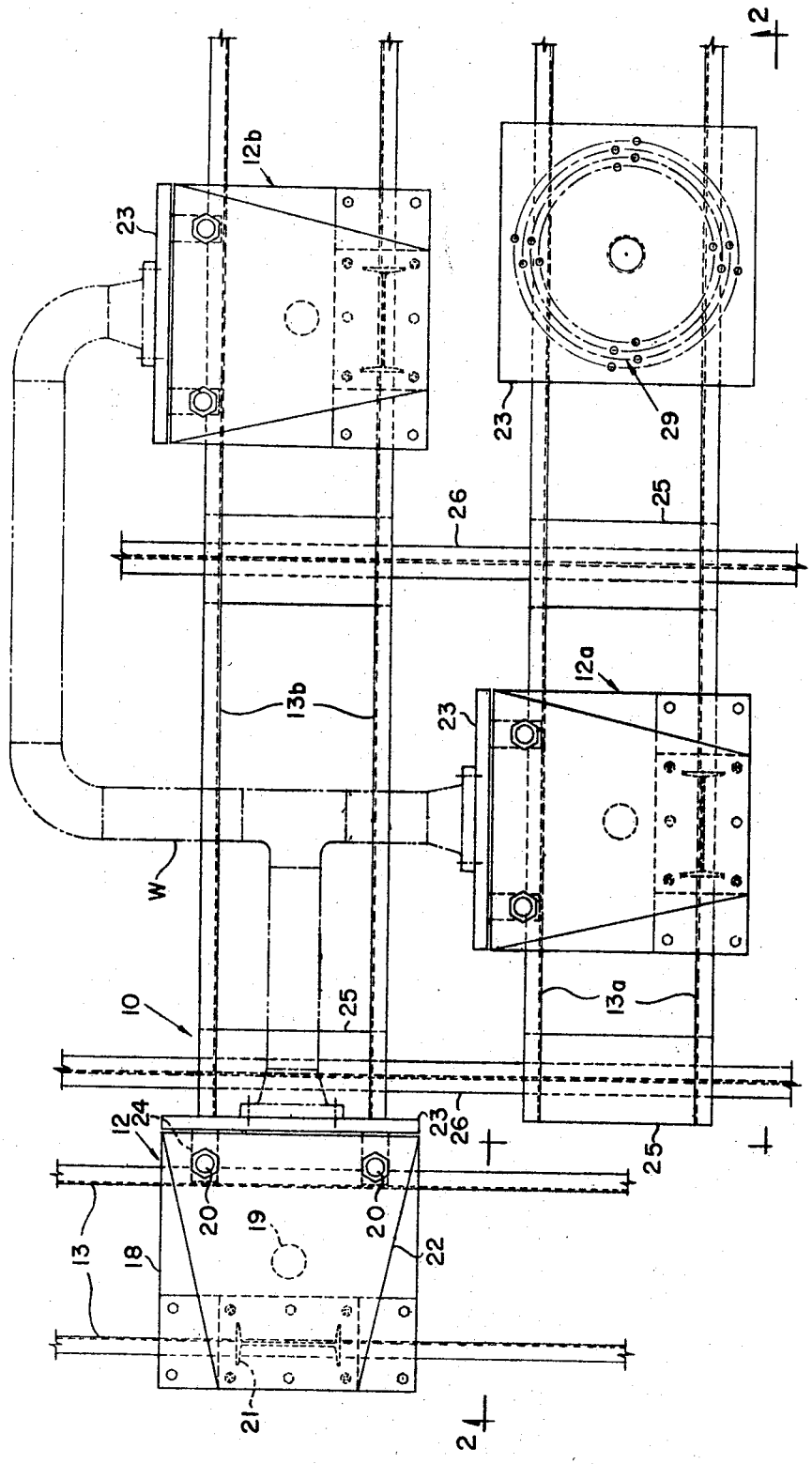
FIG. 1 is a top plan view showing a typical overall arrangement of the pipe fabrication jig of the invention, with a pipe assembly under fabrication shown in dotted lines.
Figure 2:
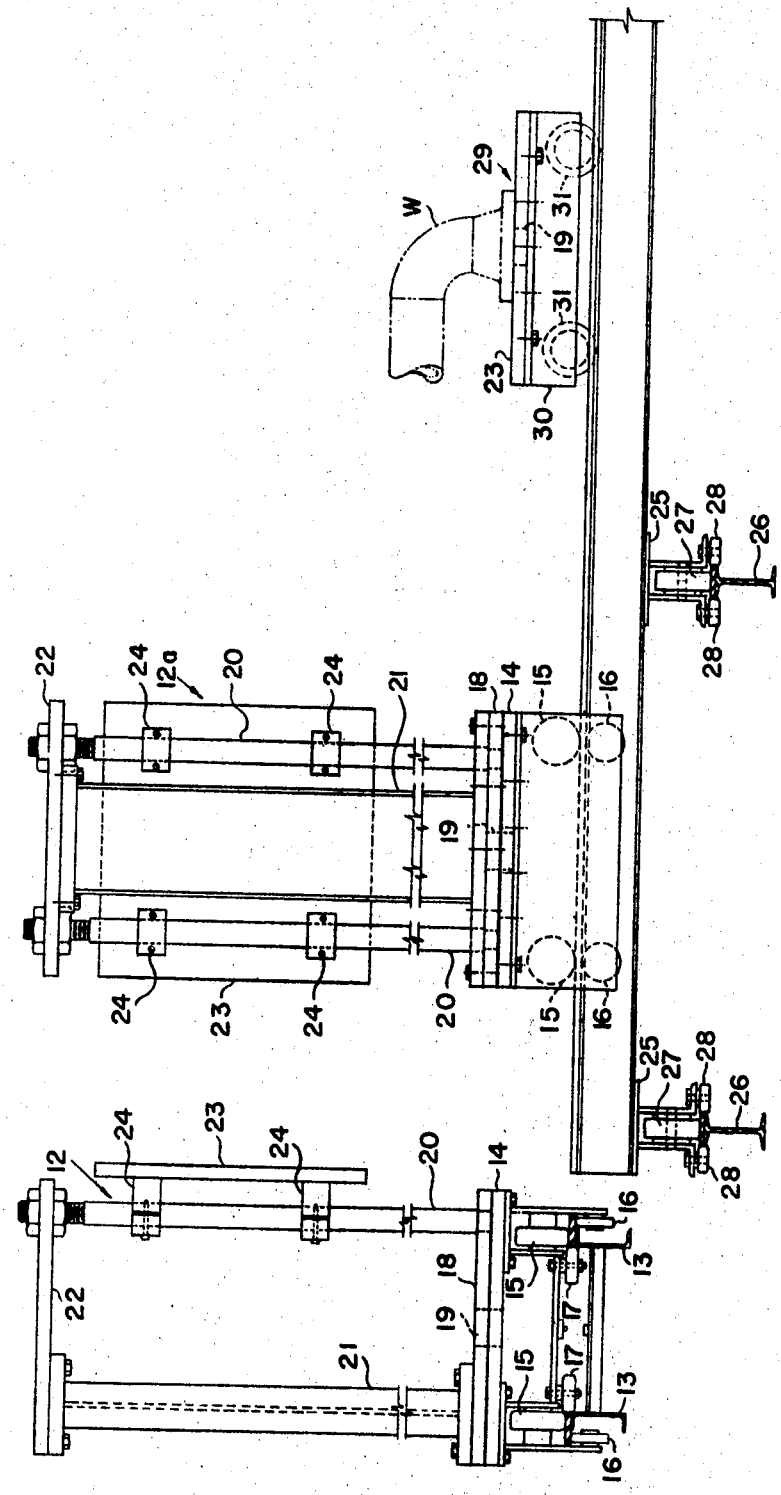
FIG. 2 is a vertical sectional view, mainly in elevation, taken substantially in the plane of the line 2—2 in FIG. 1.

Referring now to the accompanying drawings in detail, more particularly to FIGS. 1 and 2, the pipe fabricating jig of the invention is designated generally by the reference numeral 10. The same comprises a first locating plate assembly 12 which is movable along a first horizontal track 13. As is best shown in FIG. 2, the locating plate assembly 12 includes a wheeled carriage 14 having main supporting wheels 15 which travel on top of the rails of the track, guide wheels 16 which travel under the rails and guide wheels 17 which travel inside the rails, the guide wheels 16, 17 thus preventing upward and lateral displacement of the carriage relative to the track.

The carriage 14 supports a turntable 18 which is rotatable in a horizontal plane about a vertical pivot 19 on the carriage. The turntable 18 supports vertical guide means in the form of a pair of rods or bars 20 which have their lower ends secured to the turntable at points eccentrically offset from the axis of rotation of the turntable, as represented by the pivot 19. For purposes of reinforcement, a vertical standard 21 is provided on the turntable and carries a plate 22 at its upper end, the upper ends of the rods or bars 20 being secured to the plate 22, as will be clearly apparent.

A work component locating plate 23, equipped with suitable bearing member 24, is vertically slidable and thereby adjustable on the guide bars 20, and suitable means (not shown) are utilized for locking the plate 23 in an adjusted position. Also, while for sake of simplicity this is not shown in FIGS. 1 and 2, the plate 23 may be rotatable in its own plane and its plane of rotation may be angularly adjusted in horizontal as well as vertical directions, as will be hereinafter described in connection with FIGS. 6–8.

Supporting of pipe components on the locating plate 23 will also be hereinafter explained, and in the meantime, still with reference to FIGS. 1 and 2, it will be noted that the jig also includes at least one additional or second locating plate assembly 12a which is identical in construction to the assembly 12 and is removable along a second horizontal track 13a. The track 13a is disposed at one side of and at right angles to the first track 13 and is supported by a set of wheeled trolleys 25 which are movable along a set of rails 26 parallel to the first track 13. The trolleys 25 rigidly secure the rails of the second track 13a together and are equipped with traveling wheels 27 and lateral guide wheels or rollers 28 for engaging the rails 26, as will be clearly apparent.

Thus, the second locating plate assembly 12a may be moved along the second track 13a toward and away from the first locating plate assembly 12 on the track 13. Also, the track 13a with the assembly 12a thereon may be moved in one direction or the other along the rails 26, parallel to the first track 13, so that the relationship of the assemblies 12 and 12a may be adjusted as desired.

A third track 13b for a third locating plate assembly 12b may be movable along the rails 26 as shown in FIG. 1, as well as any additional such tracks and locating plate assemblies as may be needed for requirements of a particular work. Such additional tracks and assemblies, such as 13b and 12b, are identical to the track 13a and assembly 12a, already described, the assembly 12a in turn being identical to the assembly 12.

In addition to the locating plate assemblies 12, 12a, 12b which are vertically elongated and have their locating plates 23 disposed substantially vertically, the jig may include a relatively low locating plate unit 29 wherein the locating plate 23 is disposed substantially horizontally on a wheeled base 30, the wheels 31 of which may run on any one of the tracks 13, 13a, 13b, as for example, on the track 13a as shown in FIG. 2. The locating plate 23 of the unit 29 may also be rotatable and tiltable, as will be hereinafter described in connection with FIGS. 6–8.

Figure 3:
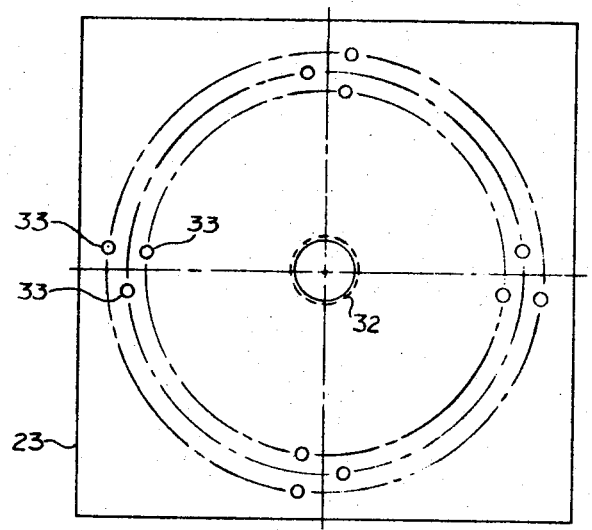
FIG. 3 is an elevational view of one of the locating plates with apertures for receiving pipe component locating pins.
Figure 4:
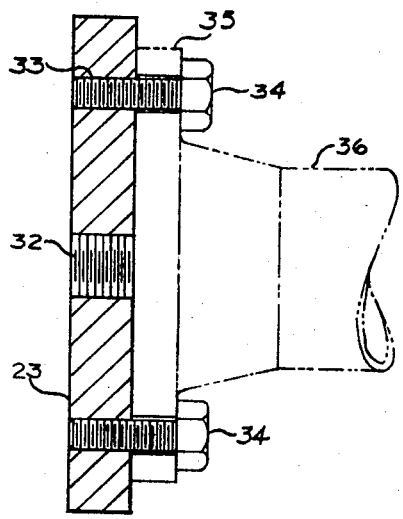
FIG. 4 is a sectional view of the locating plate with pins supporting a pipe flange.
Figure 5:
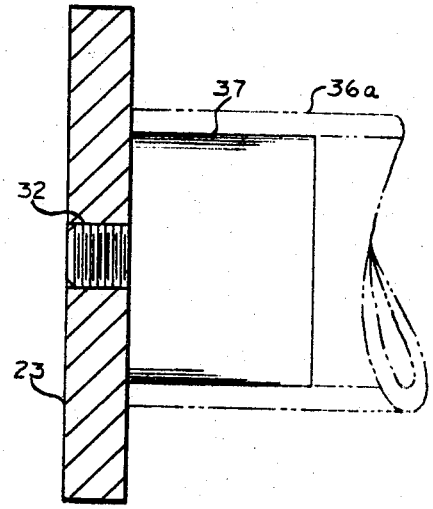
FIG. 5 is a sectional view of the locating plate with a pin for supporting a pipe without a flange.

Reference is now drawn to FIGS. 3–5 which show the locating plate 23 such as that of the assemblies 12, 12a, 12b, or of the unit 29. The plate 23 is provided at its center with an aperture 32 and the perimetric portion of the plate is provided with groups of screw-threaded holes 33 which are located at various radial distances from the center of the plate and are offset by a selected number of degrees to opposite sides of diametrical axes of the plate, as will be apparent from FIG. 3. As shown in FIG. 4, the holes 33 are adapted to selectively receive screw-threaded shanks of locating pins 34 which fit into bolt-receiving apertures of the work, as for example, apertures in the flange 35 of a pipe section 36, so that when the pipe section is applied to the locating plate 23 by inserting the pins 34 into the apertures in the pipe section flange, the pipe section is accurately supported by the locating plate. If the pipe section does not have a flange, as for example, the pipe section 36a in FIG. 5, the pins 34 are not used and a center pin 37 of a sufficiently large diameter to fit the inside of the pipe section, is installed in the aperture 32 at the center of the plate 23, thus, again supporting the pipe section on the locating plate.

It will be understood from the foregoing that when any desired number of work components such as pipes, elbows, tees, flanges, or the like, are to be assembled in a selected relationship and subsequently welded together, such components may be conveniently and accurately supported by the jig of the invention and tack welded together prior to final welding. Such supporting of the work components is possible by the virtually unlimited adjustment of the components of the jig, whereby the various locating plate assemblies 12, 12a, 12b and 29 may be positioned on their tracks at various locations relative to each other to suit the requirements of the work, and locating plates 23 themselves may be raised, lowered, rotated, angularly adjusted, et cetera, so as to appropriately support the work, as exemplified at W in FIGS. 1 and 2.

Figure 6:
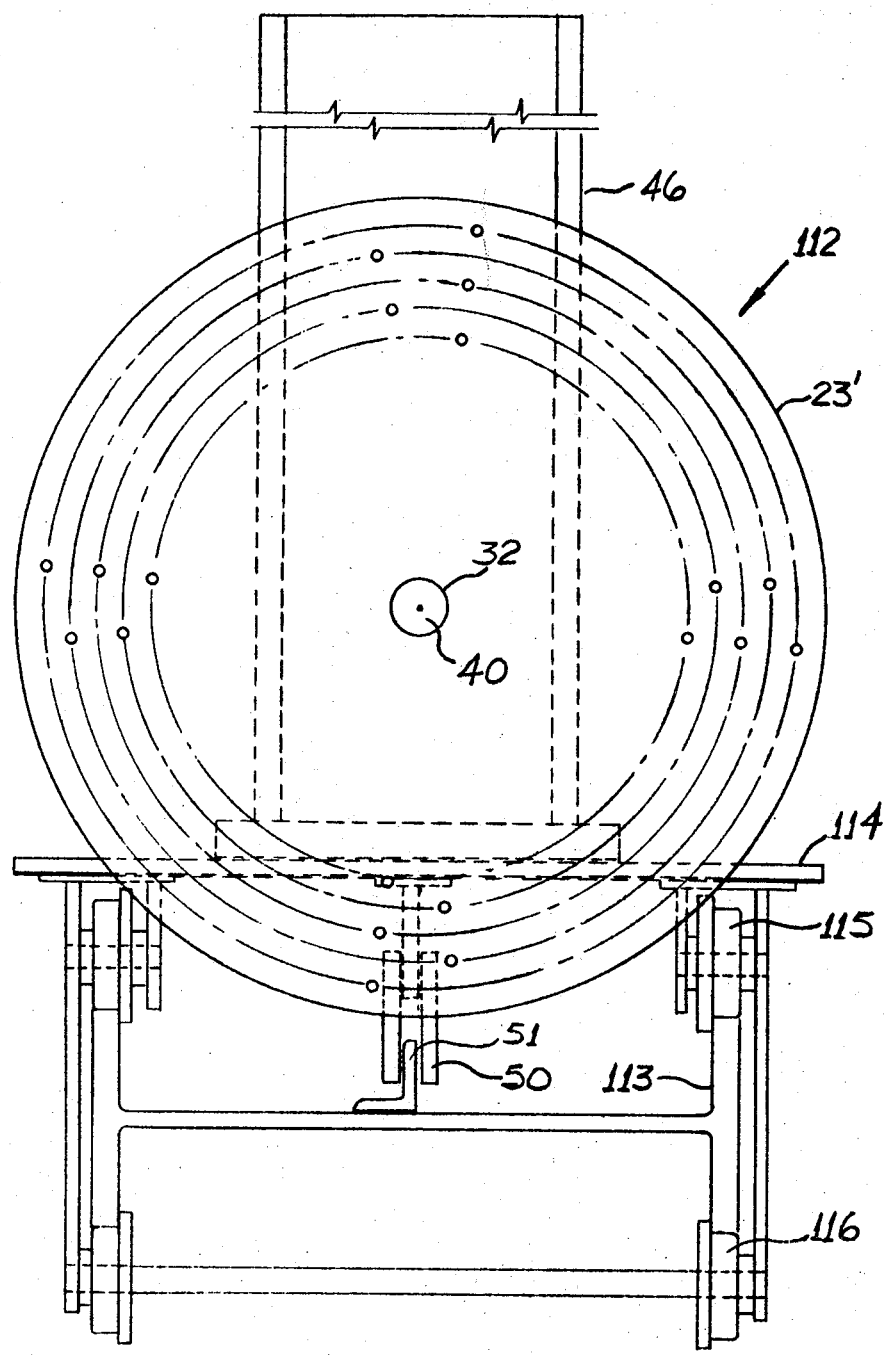
FIG. 6 is an elevational view showing a modified embodiment of the locating plate assembly.
Figure 7:
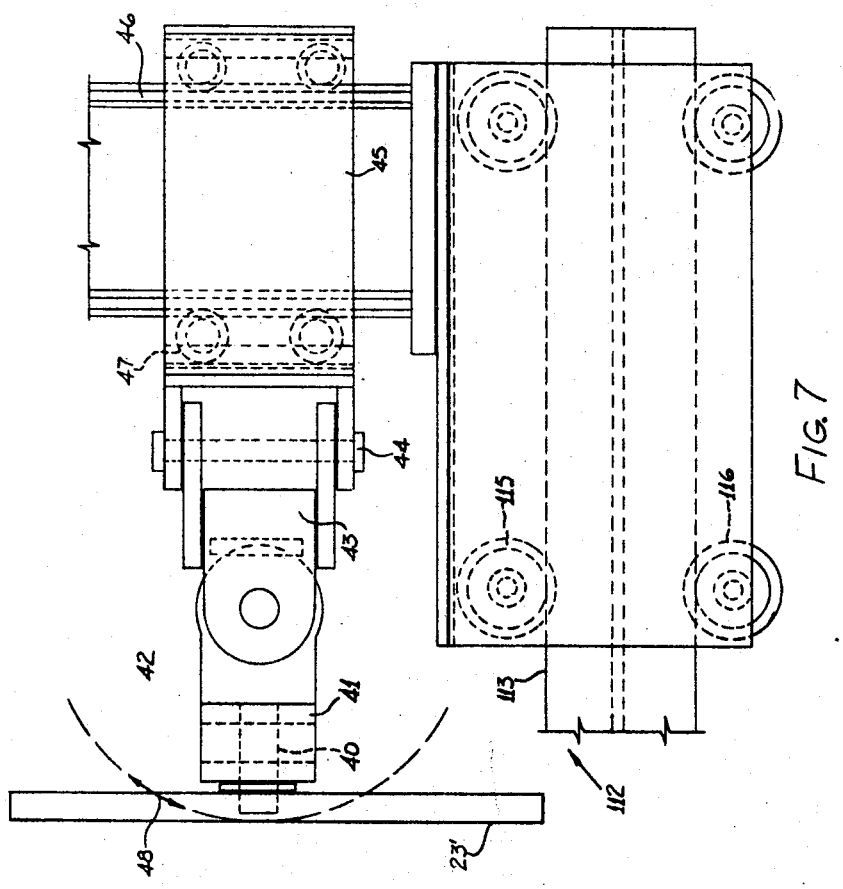
FIG. 7 is a fragmentary side elevational view of the assembly of FIG. 6.
Figure 8:
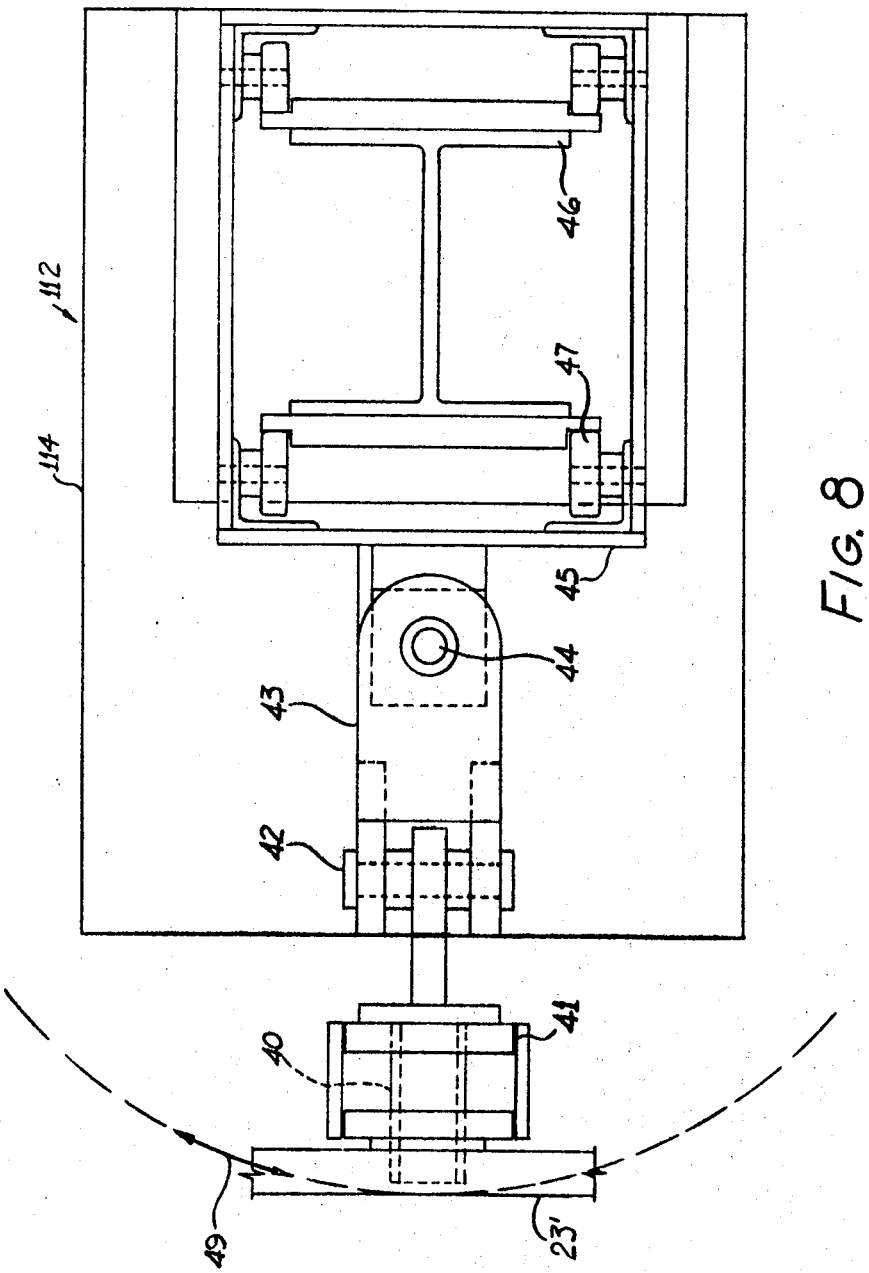
FIG. 8 is a top plan view of the assembly of FIG. 6.

Reference is now drawn to FIGS. 6-8 which show a locating plate assembly 112 having a locating plate 23' which is capable of rotation in its own plane and also of having its plane of rotation angularly adjusted both in the vertical and horizontal direction. As such, the plate 23' is supported by a stub shaft 40 rotatable in a bearing 41 which is connected by a horizontal hinge pin 42 to a yoke 43, the latter in turn being connected by a vertical hinge pin 44 to a carrier 45.

The carrier 45 is movable vertically along a vertical standard 46 on a wheeled carriage 114, suitable guide rollers 47 being provided in the carrier 45 to engage the standard 46. It will be apparent that the locating plate 23' may be raised or lowered by movement of the carrier 45 along the standard 46. The plate may also be rotated in its own plane by rotation of the shaft 40 in the bearing 41. Moreover, the plate may be moved horizontally to one side or the other as indicated at 48 by movement of the bearing 41 about the vertical hinge pin 42. In addition, the plate 23' may be tilted upwardly or downwardly as at 49 by movement of the yoke 43 about the horizontal hinge pin 44. These various adjustments enable the locating plate to assume whatever position is necessary to support a work component in the desired attitude, much more so than if the locating plate is simply vertically slidable as in the instance of the plate 23 in the assembly 12, 12a or 12b, already described. However, it is to be understood that although the assembly 112 of FIGS. 6-8 is referred to as a modification of the assembly 12 (or 12a, 12b) in FIGS. 1 and 2, the rotatable and universally adjustable assembly 112 is preferred to be used in place of the simple assembly 12 in FIGS. 1 and 2.

Inasmuch as side-to-side adjustment of the plate 23' about the vertical hinge pin 44 may be on the order of 90° to each side, the lower end of the standard 46 in the assembly 112 may be secured directly to the carriage 114. However, if desired, the carriage may be provided with a turntable (such as the turntable 18 in the assembly 12) to support the standard 46 for turning in a complete circle.

The locating plate assembly 112 may be used in place of the assemblies 12, 12a, 12b on any of the tracks 13, 13a, 13b although the wheel arrangement of the carriage 114 in FIGS. 6-8 has been modified to suit different type of track rails, as for example, an I-beam track 113 best shown in FIG. 6. The carriage 114 employs pairs of flanged wheels 115, 116 which engage the track at top and bottom as well as at the inside, thus eliminating the inside guide wheels 17 of the carriage 14. However, the carriage 114 may also have a depending guide shoe 50 for sliding engagement with a center guide rail 51 of the track 113, if such additional guidance is desirable to resist lateral displacement of the carriage on the track, that is, in addition to the guidance afforded by flanges of the wheels 115, 116.

Figure 9:
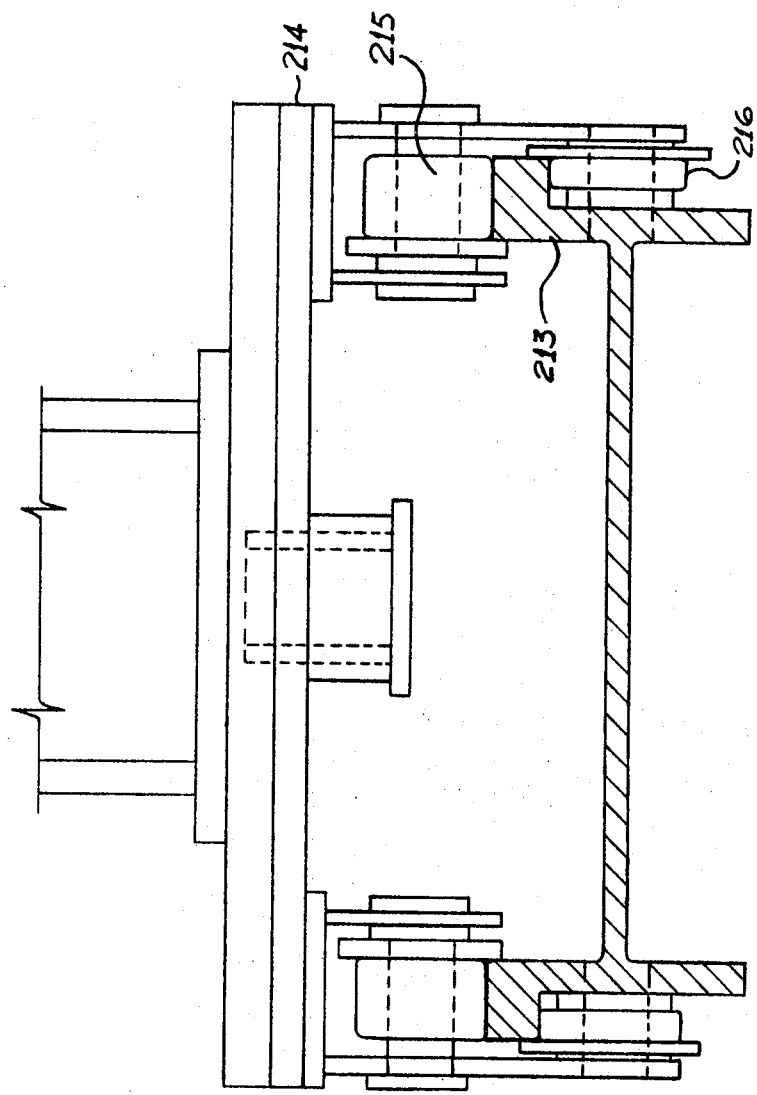
FIG. 9 is a fragmentary elevational view of another modified embodiment of the locating plate assembly.

FIG. 9 shows another modified carriage and track arrangement wherein the carriage 214 is equipped with relatively wide, flanged wheels 215 to engage the top of the track 213 and with relatively narrow, flanged wheels 216 to engage the underside of the track, thus again retaining the carriage accurately positioned on the track.

With further reference to the aforementioned locating plate unit 29, the plate 23 thereof is intended to be mounted on the wheeled base 30 in a manner similar to the plate 23' of the assembly 112. That is to say, the plate 23 is to be mounted on the base 30 by means such as the aforementioned shaft 40, bearing 41, hinge pin 42, yoke 43 and hinge pin 44, so that the plate is capable of rotation in its own plane, and its axis of rotation may be tilted in two directions at right angles to each other.

In FIG. 6 there is illustrated a carriage 114 having a depending guide shoe 50 for sliding engagement with a center guide rail 51 of the track 113.

Figure 10:
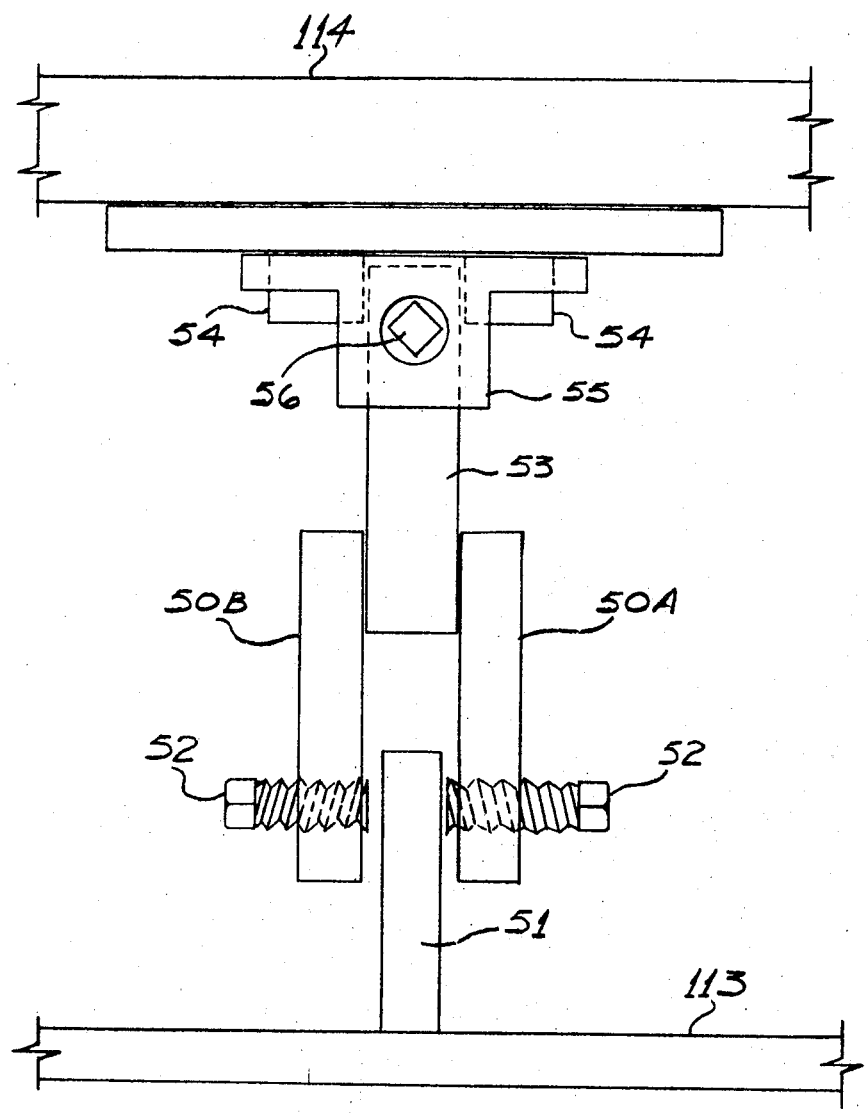
FIG. 10 is a fragmentary elevational view of a modified embodiment incorporating an anchoring device.
Figure 11:
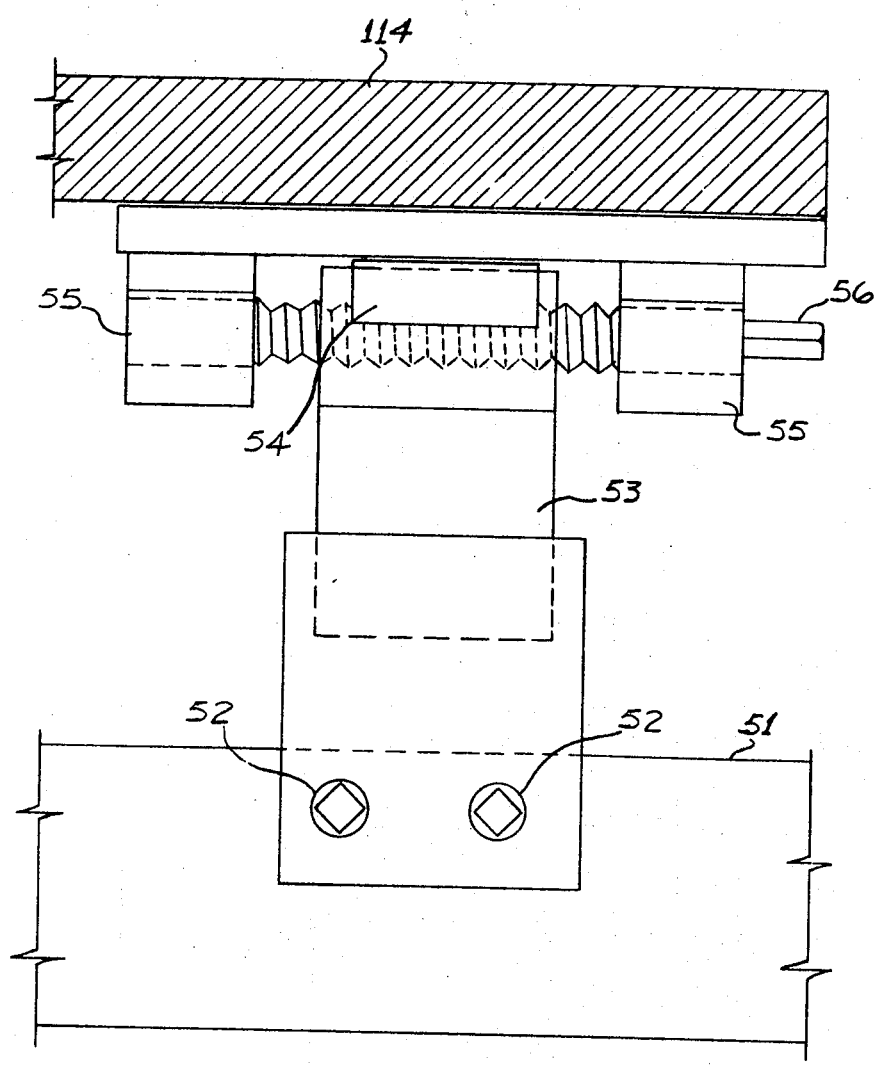
FIG. 11 is side elevation of an anchoring device.

FIGS. 10 and 11 show another modified carriage arrangement in which a positive locking device is provided to ensure that the carriage does not move after being located.

From a study of FIG. 10 it will be seen that the guide shoe 50 has been changed somewhat to provide a central guide 53 and two shoes 50A and 50B on either side of the guide rail 51. Each of these shoes has a threaded screw 52 which when tightened locks the shoes and thus the carriage 114 to the guide 51.

After the carriage has been locked in place occasionally it has been found necessary to make some minor adjustments to the positioning of the carriage. To assist in accomplishing this an adjustment screw 56 is incorporated into the top section of the guide 53. The carriage 114 is provided with two blocks 55 which are bored to accommodate the screw 56. The guide 53 has a threaded hub through which the screw 56 passes. Thus by turning the screw 56 a slight movement of the guide 53 can be achieved. Additional guides 54 are provided to reduce any lateral movement of the guide 53.

The embodiments of the invention in which an exclusive property or privilege is claimed are defined as follows:

1. In a welded pipe fabrication jig for supporting large and heavy pipe sections; the combination comprising a pair of parallel rails extending in a horizontal direction;
    a horizontally extending first track parallel to said parallel rails and spaced a horizontal direction therefrom;
    a horizontally extending second track located perpendicular to said first track such that one end of said second track is horizontally spaced from said first track;
    means for movably supporting said second track on said parallel rails;
    at least one first locating plate assembly movable along said first track;
    at least one second locating plate assembly movable along said second track and hence movable in a perpendicular direction to the direction of movement of said first assembly on said first track, each said assembly including a carriage movably mounted on the respective said track, a locating plate, means for mounting said locating plate on said carriage, means for adjusting said locating plate to a predetermined attitude relative to said mounting means, and pipe component supporting means on said locating plate.

2. The jig as defined in claim 1 together with a pair of trolleys rigid with and carrying said second track, said trolleys being movable along the parallel rails.

3. A jig as claimed in claim 1 wherein said locating plate has a substantially planar face and wherein each said assembly further comprises:
    a horizontally rotatable turntable supported by said carriage and rotatable about a vertical axis;
    a vertical standard means mounted on said turntable at a location eccentrically offset from said vertical rotational axis,
    means for mounting said locating plate to said vertical standard means, said mounting means being vertically adjustable on said vertical standard means and comprising means for universally adjusting the face of said locating plate relative to said vertical standard means about two orthogonal axes.

4. The jig as defined in claim 3 wherein each of said locating plate assemblies also includes a wheeled carriage movable along the respective track of that assembly.

5. The jig as defined in claim 3 which is further characterized in that said plate is adjustable to and out of a vertical plane.

6. The jig as defined in claim 3 which is further characterized in that said plate is adjustable to and out of a horizontal plane.

7. The jig as defined in claim 3 wherein said pipe component supporting means comprise at least one component supporting element selectively positioned in a plurality of apertures provided in said plate.

* * * * *